UNITED STATES PATENT OFFICE.

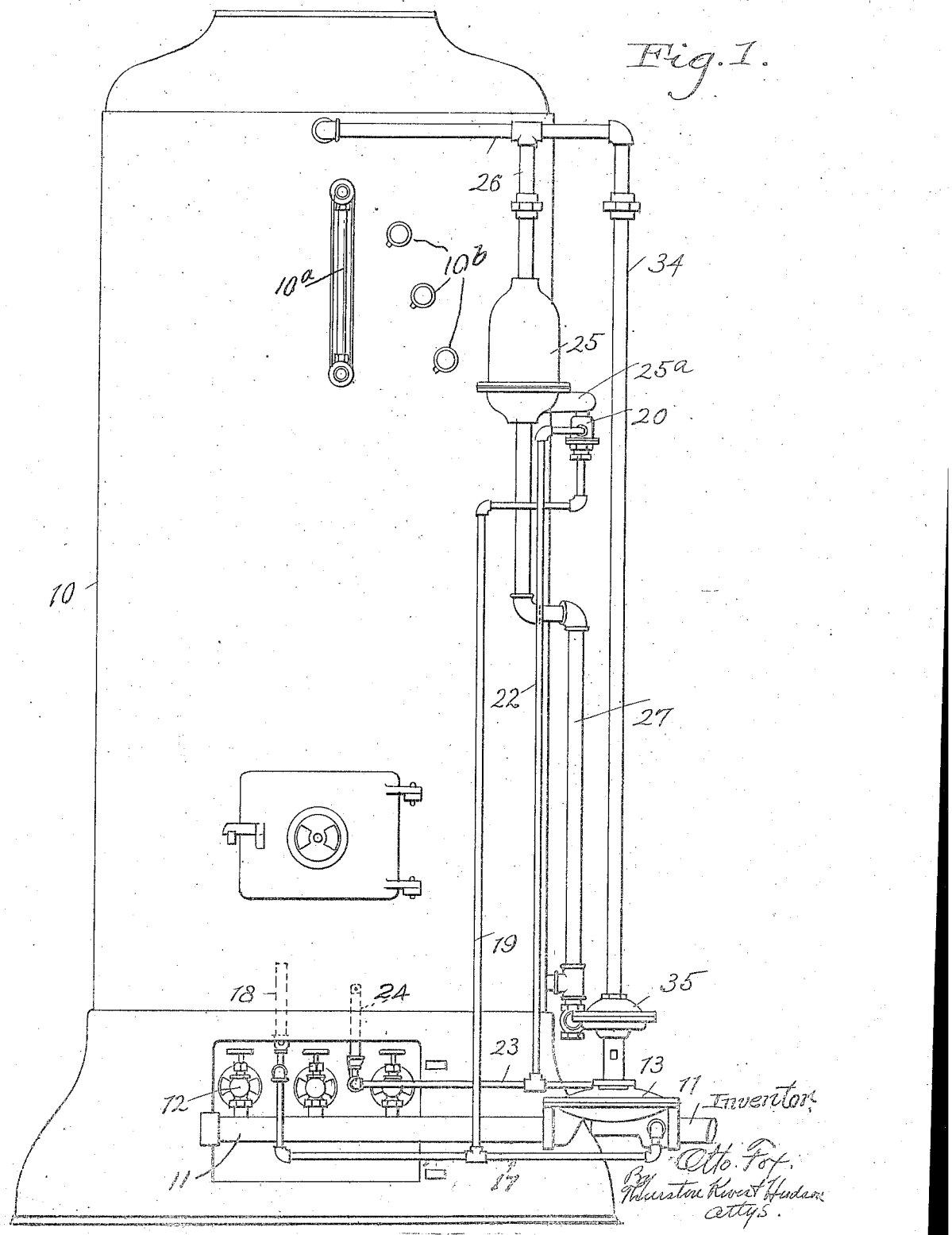

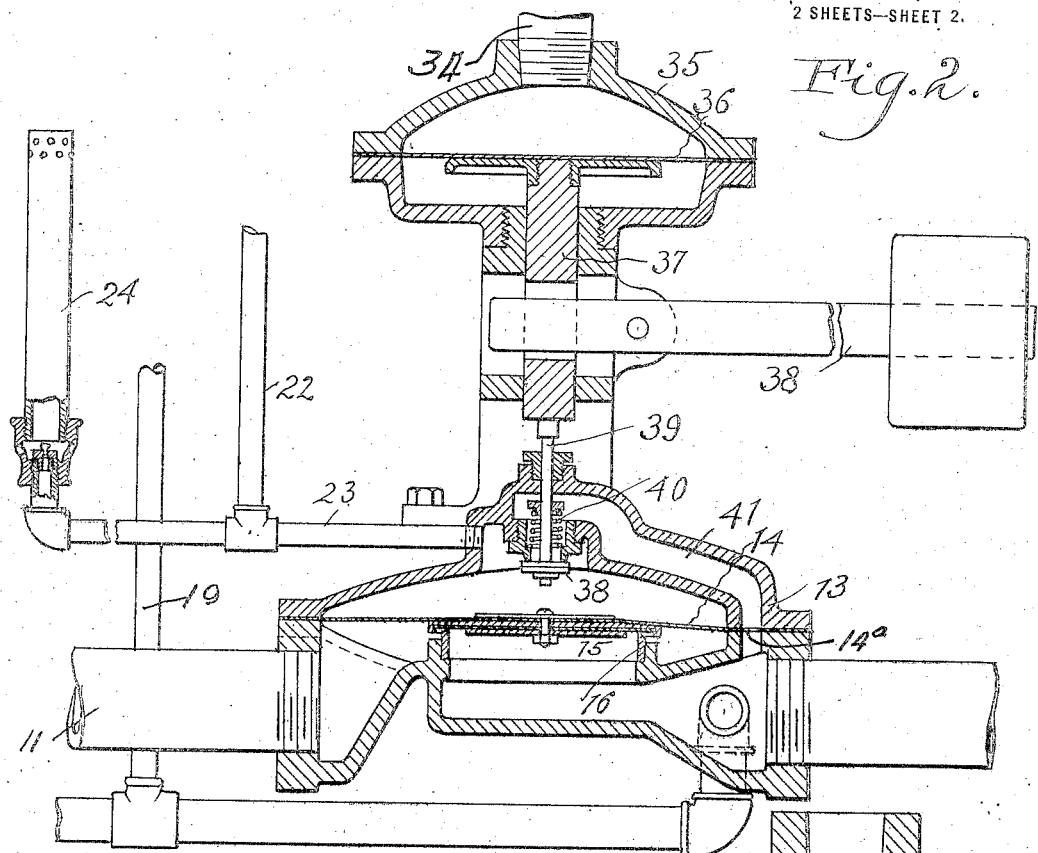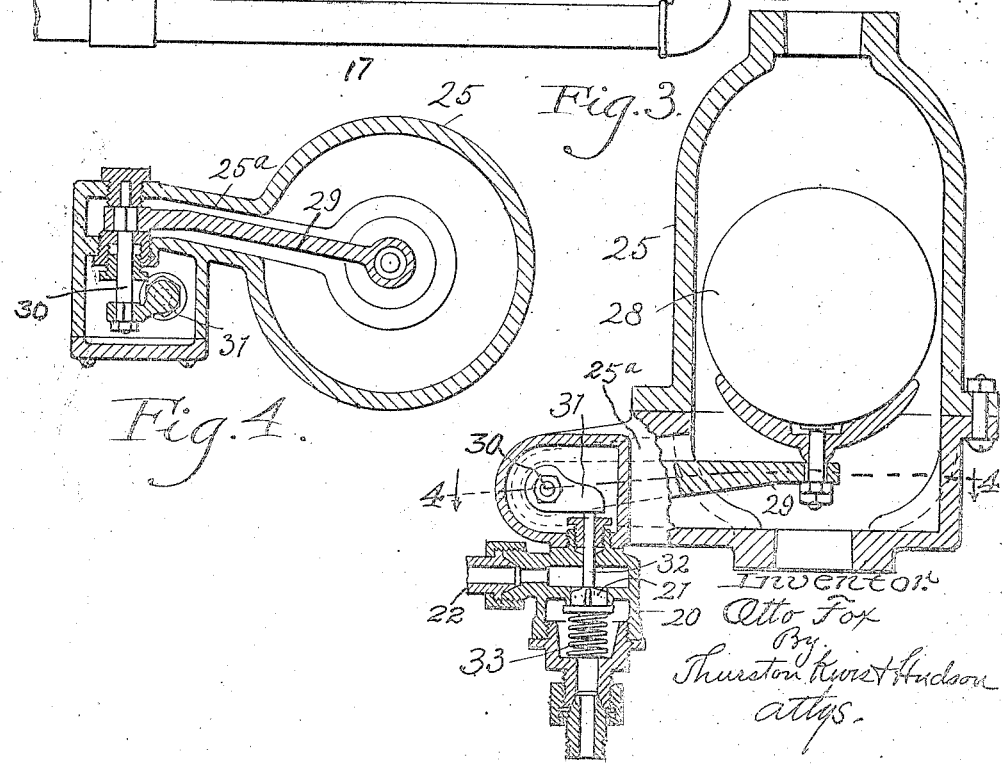

OTTO FOX, OF LAKEWOOD, OHIO, ASSIGNOR TO THE BRYANT HEATER AND MANUFACTURING COMPANY, OF CLEVELAND, OHIO, A CORPORATION OF OHIO.

FUEL CONTROL FOR BOILERS.

1,384,247.  Specification of Letters Patent. Patented July 12, 1921.

Application filed June 16, 1919. Serial No. 304,365.

*To all whom it may concern:*

Be it known that I, OTTO FOX, a citizen of the United States, residing at Lakewood, in the county of Cuyahoga and State of Ohio, have invented a certain new and useful Improvement in Fuel Controls for Boilers, of which the following is a full, clear, and exact description.

This invention relates to a fuel control for boilers which are heated by gas, and in one aspect it relates to a fuel control wherein the supply of gas is shut off when the water in the boiler reaches a predetermined low level. In another aspect the invention relates to the combination of the low water shut-off with a steam control wherein through the same instrumentality which is utilized in the low water control, steam at a given pressure shuts off the flow of gas.

The principal object of the invention is to provide a fuel control for the purpose or purposes above named, which is efficient, durable and reliable in action.

The invention may be briefly summarized as consisting in certain novel details of construction, and combinations and arrangements of parts which will be described in the specification and set forth in the appended claims.

Though the invention is not limited to a construction providing both for the low water and steam pressure controls, but is capable of being embodied in apparatus wherein it is designed to be used solely as a low water control, nevertheless my invention finds its greatest utility in apparatus having the dual functions, and such embodiment I have illustrated in the drawings, wherein Figure 1 is an elevation of a boiler equipped with a fuel control such as outlined above; Fig. 2 is an enlarged view partly in section, showing the main valve designed to be operated on the occurrence of low water or predetermined steam pressure in the boiler, together with certain parts which coöperate therewith; Fig. 3 is a sectional view of a float chamber containing a float which operates a valve for the control of gas which is utilized to operate the shut-off valve when the water reaches a predetermined low level; and Fig. 4 is a sectional view substantially along the line 4—4 of Fig. 3.

Referring now to the drawings, 10 represents a boiler which may be of any suitable construction, this boiler being heated by gas supplied through a pipe 11 having suitable burner connections indicated at 12 in Fig. 1. The boiler is shown provided with the usual gage glass 10ᵃ and tri-cocks 10ᵇ, but these are immaterial to my invention. In the pipe 11 there is an automatic gas shut-off valve which in this instance includes a casing 13, containing a diaphragm 14 (see Fig. 2) carrying a movable valve member 15, designed to engage an annular seat 16. When there is what may be termed no pressure above the diaphragm, the valve is open, and the gas passes into one side of the chamber 13, up between the valve seat and valve, and out from the opposite side of the chamber to the burners of the boiler, but when gas pressure is admitted to the top of the diaphragm the valve is closed with a snap action. In accordance with the present invention gas is supplied to the top of the diaphragm through instrumentalities controlled by the water level and steam pressure as will next be explained.

It might be mentioned at this point before describing the manner in which this valve is controlled, that while a main shut-off valve of the diaphragm type is preferred, nevertheless the invention in its broad aspects is not confined to a shut-off valve of that type. It may here be stated also, that in some of the appended claims the shut-off valve is defined as having a movable wall, and in the embodiment shown the movable wall referred to is formed by the diaphragm 14.

Taking up now the devices by which, and the manner in which the shut-off valve is closed when the water reaches a predetermined low level, it will be observed that a by-pass pipe 17 is connected to the inlet side of the valve chamber 13 and extends to a pilot burner 18. A pipe 19 extends upwardly from this by-pass pipe 17 to the bottom of a valve chamber 20, containing a movable valve member 21 which is normally closed. A pipe 22 extends from the side of the valve chamber downwardly to a pipe 23 leading to the upper part of the chamber 13 of the main shut-off valve so that when the valve in the chamber 20 is opened, gas is supplied by the pipes 17, 19, 22 and 23 above the diaphragm 14 so as to cause the closure of the shut-off valve. A pilot burner 24 is connected to the pipe 23 as shown in Figs. 1 and 2. This pilot burner 24 is provided simply as a convenient means for disposing of the excess gas supplied to the upper part of the chamber 13 when the shut-off valve is closed. It receives no gas when the shut-off valve is open, though the pilot burner 18 is supplied with gas whether the shut-off valve is open or closed.

For the control of the valve 21 in this by-pass piping I provide a float chamber 25 connected by piping 26 and 27 to the steam and water sides of the boiler so that the water level in the chamber will be the same as the water level in the boiler. This chamber contains a float 28 (see Fig. 3) which is connected to a pivoted arm 29, extending laterally through an extension 25ª of the float chamber and secured to a pin or stud 30 suitably supported in said extension and provided with a valve operating finger 31 which is above a pin 32 connected to the valve member 21 in valve chamber 20. A spring 33 (shown in Fig. 3) closes this valve.

It will be seen therefore, that when the water in the boiler reaches a predetermined low level, causing the float to move downward to a predetermined point, the valve member 21 is opened or moved away from its seat so as to allow the gas to pass from the pipes 17 and 19 through the valve chamber 20 and by the pipes 22 and 23 and into the upper part of the chamber 13 above the diaphragm 14 of the shut-off valve whereupon this valve is quickly closed. It will be seen also, that when the water level rises, the valve member 21 will be moved to closed position, stopping the flow of gas through the by-pass piping, and allowing the pressure above the diaphragm to be relieved and the shut-off valve to open. As long as the low water level in the boiler continues, the gas flows through the by-pass piping and valve chamber 20, the excess gas over that required to maintain the pressure above the diaphragm passing to the pilot burner 24 and being consumed, and when the valve in the chamber 20 is closed by the water level rising, the pressure above the diaphragm is relieved through the pilot burner 24.

I believe it is new with me to provide a gas shut-off valve with a pressure responsive device, in this instance a diaphragm, and which is shifted to cause the closure of the valve by gas controlled by a valve operated by a float or equivalent means, and this subject matter I intend to claim broadly irrespective of the type or form of shut-off valve, and without regard to whether or not the shut-off valve is closed also on the occurrence of predetermined steam pressure.

The steam pressure control of the main shut-off valve is effected by means of a pipe 34 extending from the piping 26 downward to the upper part of a diaphragm chamber 35 containing a diaphragm 36 connected to a plunger 37, normally held upward by a weighted lever 38. By reference to Fig. 2 it will be seen that the plunger 37 connected to the diaphragm 36 is directly above a valve plunger 39 connected to a valve member 38 which is normally held against the valve seat by a spring 40. When this valve is open, gas may pass from the inlet side of the valve chamber 13 through an opening 14ª in the diaphragm 14 and by way of a passageway 41 (see Fig. 2), to the interior of the chamber above the diaphragm 14, thus closing the shut-off valve with a snap action. This occurs when the steam pressure reaches a value such that the pressure on the diaphragm overcomes the force acting in the opposite direction to the weighted lever, and lowers the plunger and valve pin 39. The gas continues to flow to the upper part of the chamber 13, and out through the pipe 23 and pilot burner 24 as long as the steam pressure is above a predetermined value, but when the pressure drops, the valve member 38 is closed, thus relieving the pressure above the diaphragm and permitting the gas pressure in the main pipe to again open the shut-off valve.

Thus should the water in the boiler reach a predetermined low level, or should the steam pressure rise to a predetermined value, gas from the main supply pipe is admitted to the pressure responsive device which causes the closure of the shut-off valve. Not only is the valve closed by gas pressure, but it is closed with a snap action, as is desirable in a device of this kind. On the other hand, when the condition which caused the closure of the valve, i. e. the low water or steam pressure condition is relieved, the valve is again opened by pressure of the gas.

The apparatus which I have provided is not only efficient but it is reliable in action over a long period of time, the construction and operation being such that the parts are not liable to get out of order.

I aim in my claims to cover all modifications which do not involve a departure from the spirit and scope of my invention in its broadest aspects.

Having described my invention, I claim:

1. In combination with a boiler having a gas supply pipe, a shut-off valve in said pipe provided with a pressure responsive device for closing the same, a normally closed connection between the gas supply pipe and the pressure responsive device, and means whereby when the water in the boiler reaches a predetermined low level said connection is opened so as to permit the shut-off valve to be closed by gas pressure.

2. In combination with a boiler having a float chamber containing a float, and having a gas supply pipe, a shut-off valve in said pipe provided with a pressure responsive device for closing the same, a normally closed connection between the gas supply pipe and the pressure responsive device, a valve in said connection, and means whereby the float opens said valve when the water reaches a predetermined level in the boiler.

3. In combination with a boiler having a gas supply pipe, a shut-off valve in said pipe provided with a pressure responsive device for closing the same, by-pass piping between the gas supply pipe and said pressure responsive device, said piping having a normally closed valve, and means for opening said valve when the water in the boiler reaches a predetermined low level.

4. In combination with a boiler having a gas supply pipe, a shut-off valve in said pipe having a valve member and a movable wall carrying the same, and means controlled by the water level in the boiler for admitting gas from said supply pipe to one side of said movable wall so as to close the said valve.

5. In combination with a boiler having a gas supply pipe, an automatic shut-off valve in said pipe, said valve having a movable wall forming a chamber, piping for supplying gas from the gas supply pipe to said chamber, said piping having a normally closed valve, and means whereby the said valve is opened when the water in the boiler reaches a predetermined low level.

6. In combination with a boiler having a gas supply pipe, an automatic shut-off valve in said pipe, said valve having a movable wall forming a chamber, piping for supplying gas from the gas supply pipe to said chamber, said piping having a normally closed valve, and means whereby the said valve is opened when the water in the boiler reaches a predetermined low level, said chamber having an outlet for relieving the gas pressure therein when the water level in the boiler rises.

7. In combination with a boiler having a gas supply pipe, a shut-off valve in said pipe having a pressure responsive device, means including normally closed valves for supplying gas from the gas supply pipe to the pressure responsive device, means whereby one of said normally closed valves is opened when the steam in the boiler reaches a predetermined pressure, and means whereby the other normally closed valve is opened when the water in the boiler reaches a predetermined low level.

8. In combination with a boiler having a gas supply pipe, an automatic shut-off valve in said pipe, including a movable wall forming a gas chamber normally free of gas pressure, and devices controlled respectively by steam pressure and by the water level in the boiler for admitting gas to said chamber to close the valve.

9. In combination with a boiler having a gas supply pipe, a shut-off valve in said pipe having a movable wall carrying a valve member, said wall being subjected on one side to the pressure of gas in the supply pipe, the opposite side of said wall being normally relieved of gas pressure, and means for supplying gas to the opposite side of said wall when the steam reaches a predetermined pressure and when the water in the boiler reaches a predetermined low level.

In testimony whereof, I hereunto affix my signature.

OTTO FOX.